Patented May 10, 1932

1,858,230

UNITED STATES PATENT OFFICE

GEORGE P. WALTON AND ROBERT F. GARDINER, OF WASHINGTON, DISTRICT OF COLUMBIA

FERTILIZER MATERIAL AND PROCESS FOR MANUFACTURING THE SAME

No Drawing.   Application filed March 26, 1929.  Serial No. 350,121.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes without payment to us of any royalty thereon.

We hereby dedicate the invention herein described to the free use of the public, to take effect upon the granting of a patent to us.

This invention relates to a process for preparing fertilizer material of satisfactory quality from peat, by subjecting the peat to the action of certain chemical substances used or produced in the preparation of such concentrated fertilizer salts as mono-potassium phosphate and mono-ammonium phosphate; particularly when the said salts are prepared by the process described in U. S. Letters Patent No. 1,456,850. It also relates to certain properties of the products so prepared with reference to use of the products as fertilizer.

The term "peat" as used throughout the present specification and claims refers not only to well-defined peats with low soil-mineral content, but also to natural peat material which contains larger amounts of mineral matter and in which the vegetable or organic matter is well decomposed and disintegrated, namely, to material termed "muck" by some authorities, and also to peat material in general, for example, to peats manipulated to increase the organic matter content, etc. Peat, either in its natural state or after drying, has low fertilizer value, and is not to be compared with stable manure, for example, as a means of increasing crop production. Although peat may contain important amounts of nitrogen which commonly comprises from one to four per cent of the dry material, the nitrogen is not in a readily utilizable form, but is due to the accumulation of nitrogenous material that is not available for the use of plants, the more soluble substances having been leached away. A layer of natural peat, even peat that would be classed as well decomposed, has in it very little available plant-food of any kind. On the other hand, the inclusion of dry peat in mixed fertilizer, particularly in concentrated fertilizer mixtures offers certain advantages on the score of physical condition. Dry peat of a suitable degree of fineness serves well in improving the mechanical condition of mineral fertilizer salts with which it is mixed, since the presence of the dry peat particles reduces the tendency of such salts to become either caked or sticky. In the manufacture of mixed fertilizers, the use of peat as a conditioner, as well as a filler, appears to have been satisfactory to the mixer.

The principal object of this invention is to utilize peat (of suitable type) for the production of fertilizer material of accredited quality, by treating the peat by a comparatively simple chemical process which may be part of, or readily related to, a process employed in the preparation of other fertilizer materials, such as the aforementioned concentrated fertilizer salts mono-ammonium phosphate and mono-potassium phosphate. By fertilizer material of "accredited quality" is herein meant: Material in which the fertilizer constituents, i. e. the nitrogen, phosphoric acid, and potash are found to be satisfactorily soluble or "available", by the usual chemical tests; and this definition, in the case of fertilizer containing such material as peat, entails that the water-insoluble organic nitrogen shall exhibit satisfactory "activity" as measured by the generally recognized chemical tests.

Other objects of this invention are: First, to produce fertilizer of accredited quality containing a relatively large amount of peat organic matter, and deriving a relatively large share of its available nitrogen from contained peat; and second, to provide for the utilization of peat in the production of concentrated fertilizers containing (besides water-soluble nitrogen, phosphoric acid and potash) water-insoluble organic nitrogen of satisfactory quality and important amounts of peat organic matter, the presence of which tends to improve the chemical and physical properties of the fertilizer.

A feature of this invention consists, therefore, in improving by comparatively simple chemical treatment, the availability for fertilizer purposes of the nitrogen of peat of suitable type. By "peat of suitable type" is herein meant peat that does not contain substances distinctly injurious to plants; that is largely composed of organic matter sufficiently carbonized and disintegrated to respond satisfactorily to the chemical treatment hereinafter described; and that contains sufficient organic nitrogen to make its treatment profitable.

Another feature consists in utilizing chemical substances and heat used or produced in the preparation of fertilizer materials, for example, mono-potassium and mono-ammonium phosphates, for increasing the availability of the nitrogen of peat, thereby minimizing the cost of enhancing the fertilizer value of the peat material.

Advantages to be derived from our invention, and its practical application, become apparent on consideration of the fact that, in spite of the wide distribution and immense quantity of peat of suitable type in the United States, representing a great store of cheap peat nitrogen at hand, the use of peat as a source of plant food in commercial fertilizers has been negligible, chiefly because of the inertness, or insolubility of the nitrogen of untreated peat.

In the process hereinafter disclosed, peat, initially in a natural moist condition, is successively subjected to the action of (1) heat; (2) a hot acid melt essentially consisting of a mixture of mono-potassium phosphate and free phosphoric acid, preferably in approximately equimolecular proportions; and (3) eventually to the action resulting from neutralization of the moistened acid mass with ammonia, in the formation of mono-ammonium phosphate. Although we prefer to subject peat in a natural moist condition first to drying and further heating, we do not wish to be understood as restricting ourselves thereto, since partial drying alone may suffice for the first step in the process. The process may also include a preliminary treatment of the natural peat with the warm hydrogen chloride evolved in the preparation of a prior batch of mono-potassium phosphate from potassium chloride and phosphoric acid. By subjecting peat of suitable quality to this novel treatment, we have obtained a product which, even when it contained as much as 40 per cent by weight of peat organic matter, passed official chemical tests as to the solubility and so-called "activity" or "availability" of its contained nitrogen.

Although we do not wish to be understood as restricting ourselves thereto, we have also discovered that a preliminary heating of peat of a certain type by itself to a temperature between 180° and 220° C. for a period of several hours has the effect not only of rendering the nitrogen more soluble and increasing the activity of the water-insoluble nitrogen, but also of materially increasing the percentage content of total nitrogen as a result of destruction of organic matter without commensurate loss of nitrogen. Further, we have determined that a preliminary treatment of peat with warm hydrochloric acid vapors, such as are produced in the preparation of mono-potassium phosphate from potassium chloride and an excess of phosphoric acid, results in increasing the solubility and activity of the nitrogenous substances of the peat.

As an example of the carrying-out of our invention, its application to the treatment of peat of a particular type for the production of fertilizer will now be described. This description is confined to a particular peat only because such features of the process as the preliminary treatment of the peat, and within certain limits the relative quantity used with respect to the other ingredients, would depend on the physical characteristics of the peat and its content of organic matter. For instance in the processing of a fibrous peat of comparatively refractory character, a preliminary treatment of the moist peat with evolved hydrogen chloride as before mentioned, would be indicated prior to drying and heating. We hold that the invention is applicable to any "peat of suitable type" as previously defined herein; and we do not wish to be restricted to the particular kind of peat which we have selected to serve as an example in the following description.

The peat used in this example is a black, well disintegrated peat of neutral reaction containing, on the moisture-free basis, 64 per cent of organic matter, and 3.2 per cent of total nitrogen of which a negligible amount is water-soluble. In its natural condition it contains after digging and draining, about 50 per cent by weight of moisture. In processing such raw peat, we proceed substantially as follows:

Starting as for the preparation of an equimolecular mixture of mono-potassium and mono-ammonium phosphate by the process described in U. S. Letters Patent No. 1,456,850, namely with a solution of phosphoric acid preferably of 70 to 90 per cent $H_3PO_4$ concentration and solid potassium chloride, we prefer likewise to take an amount of the acid equivalent to two gram molecules of $H_3PO_4$ for each gram molecule of KCl used, and heat the mixture of acid and salt to a temperature between 200° and 250° C. until most of the chlorine has been evolved as hydrogen chloride and there remains a hot liquid melt consisting essentially of an equimolecular mixture of free phosphoric acid and mono-potassium phosphate. This liquid mixture we will designate the hot melt. In the meantime we take a quantity of the peat equivalent to preferably, 233⅓ parts by weight of moisture-free peat for every 100 parts of absolute $H_3PO_4$ contained in the acid taken for the preparation of the hot melt; and preferably heat the peat in an oven or kiln maintained at 150° to 170° C. until the peat has dried out and attained a temperature approximating that of the oven. The independent operations should be so timed that the peat reaches a temperature of 150° C. at approximately the same time that the evolution of HCl from the hot melt begins to subside. Most of the HCl will have been evolved by the time the melt has been kept at a temperature between 200° and 250° C. for one-half hour.

As soon as the elimination of HCl from the hot melt has been completed, the peat preferably at a temperature of about 150° C. is added to, and well mixed with the melt at 250° C.; after which the temperature of the mixture is maintained at 170°–180° C. for one to one and one-half hours. During this time, which may be called the reaction period, the fluid or pasty mass is kept well stirred. The peat appears to be partially decomposed by the melt at the temperature stated above, and the whole mass becomes fluid so that thorough mixing is easy of accomplishment. At the conclusion of the reaction period, the mixture is allowed to cool, is then well moistened with cold water, and with vigorous stirring, the excess of acid is neutralized by the addition of ammonia, which may be added in the form of a solution of ammonia, or as gaseous $NH_3$, if sufficient water has been added to the mix to guard against material loss of the gas. In case gaseous $NH_3$ is used, it has been found advisable to add to the mix, up to 2 parts of water for each part of dry peat originally taken (up to 467 parts of water for every 100 parts of absolute $H_3PO_4$ used in the preparation of the acid potassium phosphate melt). By keeping the mass cold during neutralization, less water will suffice. We prefer to carry the neutralization of the excess phosphoric acid slightly beyond the point where all of the free acid has been converted into mono-ammonium phosphate, preferring to employ about $1\frac{1}{6}$ gram molecules of $NH_3$ for every 2 gram molecules of $H_3PO_4$ originally taken. We have found that the extra ammonia is retained in the final dried product, so prepared; and the reaction of the product is preferable to that resulting from neutralization with only one equivalent of ammonia. After neutralization as above described, the product may be dried, either in an oven or kiln operated at atmospheric pressure at 100° to 105° C., or under partial vacuum at 70° to 75° C., without material loss of ammonia.

An additional operation, which may at times prove helpful during the reaction period in controlling the temperature of the mixture of peat and hot melt and thereby controlling any destructive decomposition of the peat organic matter, consists in forcing air, preferably through a perforated outlet or some such distributing device, through the hot fluid mixture; but we do not wish to be understood as intending to restrict our process to the inclusion of this operation.

A recapitulation of the relative quantities of the several ingredients used, and a statement of the quantity and certain properties of the final product resulting, in the carrying out of our process, in the foregoing example, follow:

Taking 100 parts by weight of absolute $H_3PO_4$ as the basis for quantity comparisons, if an acid of 75 per cent $H_3PO_4$ concentration were used, $133\frac{1}{3}$ parts of this acid and 38 to 40 parts of high grade potassium chloride would be required in preparing the equimolecular mixture of mono-potassium phosphate and free phosphoric acid. Approximately $18\frac{1}{2}$ parts by weight of HCl would be evolved, and the hot melt would amount to 119 to 120 parts. The quantity of peat used would vary with the moisture content, but in the foregoing example would preferably amount to the equivalent of about 233 parts of the moisture free peat. In the neutralization of the free acid remaining in the mixture of peat and hot melt, after cooling, water up to 467 parts, and $10\frac{1}{6}$ parts by weight of absolute $NH_3$ would be required. On a moisture-free basis, the final product comprising the processed peat and mono-potassium and mono-ammonium phosphates would amount to approximately 350 parts.

The composition and certain properties of such a product, actually prepared as described, and which amounted to 358 parts on this weight basis, are cited below as an example, in order to give a general idea of the kind of fertilizer material producible by our process. This product contained: Moisture, 2.3 per cent; organic matter (of peat origin) 39.5 per cent; total nitrogen 4.38 per cent; water-soluble nitrogen 2.38 per cent; available phosphoric acid ($P_2O_5$) 20.6 per cent; total potash ($K_2O$) 6.6 per cent. The water insoluble (organic) nitrogen was found by one of the official chemical tests to be of "satisfactory quality" or "activity." The reaction of this product was less acid than that of an equimolecular mixture of mono-potassium and mono-ammonium phosphates alone, since a 5 per cent aqueous extract of the product was found to have a hydrogen-ion concentration of pH 5.2, whereas a similar extract of the equimolecular mixture of $KH_2PO_4$ and $NH_4H_2PO_4$ usually shows a pH of 4.4 to 4.6. The product, as prepared, was a friable, dark gray mass, readily reducible to a coarse or fine powder which proved to be practically non-hygroscopic. The physical or mechanical condition of the pulverized product appeared to be equal to that of a pulverized mixture of $KH_2PO_4$ and $NH_4H_2PO_4$, which in this respect rates as one of the best inorganic fertilizer materials; and in maintaining a dry and excellent mechanical condition in storage under varying conditions of temperature and relative humidity, a comparative test showed the peat product to be slightly superior to the mixed phosphates alone.

The preferred method or process herein described has been found to be particularly effective in treating peat, but essentially it is applicable to the treatment of other organic materials containing nitrogen such as so-called organic ammoniate fertilizer materials or so-called rough ammoniates.

We have described a typical example of the carrying out of our process and of the product producible thereby, but by varying the proportions of the raw materials, products corresponding to a considerable range of other fertilizer mixtures may be prepared by treating peat, peat material, or other organic matter in essentially the same way. The foregoing description of our process should therefore be construed as illustrative and not as limiting with respect to the details of procedure, proportions of the ingredients, conditions of temperature, time of processing and the like. Such details may be varied materially without departure from the essentials of our invention or the scope of the following claims.

We claim:

1. A process for preparing fertilizer from peat, which comprises treating the peat by incorporating it with and digesting it in a hot melt essentially comprising mono-potassium phosphate and phosphoric acid, adding water to the resulting mixture, neutralizing the excess of acid with ammonia, and drying the product.

2. A process for the production of a concentrated or high-analysis fertilizer containing a substantial amount of peat organic matter as well as of the three essential constituents of fertilizer and including an appreciable amount of water-insoluble organic nitrogen derived from peat, the water-insoluble nitrogen of the product being of satisfactory quality as herein defined; which process comprises incorporating peat or peat material with a hot melt essentially comprising mono-potassium phosphate and phosphoric acid, digesting the peat therein while agitating the mass, adding water, neutralizing the excess acid with ammonia while agitating, and dehydrating the product in such a way as to avoid material loss of ammonia.

3. A process for the production of a concentrated fertilizer possessing desirable physical and mechanical properties and containing substantial amounts of organic matter and of the three essential constituents of fertilizer of satisfactory availability; which process drying and heating peat to a temperature between about 150° C. to 170° C., incorporating it with a hot melt essentially comprising mono-potassium phosphate and phosphoric acid in approximately equimolecular proportions heated to a temperature between about 200° C. to 250° C., agitating the resulting mixture and digesting the peat therein at a temperature between about 170° C. to 180° C. for approximately one hour, adding water to the mass after it has cooled, neutralizing the excess of acid with ammonia in amount at least equal to one gram molecule of ammonia for each gram molecule of free phosphoric acid contained in the hot melt, and dehydrating the product in such a way as to avoid material loss of ammonia.

4. A process for the treatment of peat for the production of fertilizer, which comprises drying and heating the peat, incorporating the hot peat with and digesting it in a hot melt essentially comprising mono-potassium phosphate and free phosphoric acid, agitating the mass, adding water thereto after it has cooled to a temperature below 100° C., neutralizing the excess of acid with ammonia, and dehydrating the product in such a way as to avoid material loss of ammonia.

5. A process for the treatment of peat for the production of fertilizer, which comprises, first, subjecting the peat in a partly moist condition to the action of hydrogen chloride, drying the peat so treated and heating it, thus driving off hydrogen chloride, then incorporating the resulting peat material with a hot melt essentially comprising mono-potassium phosphate and free phosphoric acid and digesting it therein, adding water to the resulting mixture after it has cooled, neutralizing the excess of acid with ammonia, and dehydrating the product in such a way as to avoid material loss of ammonia.

6. A process for treating peat to increase the solubility or availability for fertilizer purposes of its nitrogen, which process comprises heating the peat, incorporating it with a hot melt essentially comprising mono-potassium phosphate and phosphoric acid, digesting it therein, and neutralizing the excess of acid.

7. A process for treating peat to increase the solubility or availability for fertilizer purposes of the peat nitrogen, which process comprises first, subjecting the peat in a partly moist condition to the action of hydrogen chloride, drying the peat so treated and heating it so as to drive off hydrogen chloride, then incorporating the resulting peat material with a hot melt essentially comprising mono-potassium phosphate and free phosphoric acid and digesting it therein with agitation, and neutralizing the excess of acid.

8. A process for treating peat to increase the solubility or availability for fertilizer purposes of the peat nitrogen by subjecting the peat to the action of heat and chemical substances produced and present in the production of concentrated fertilizer material, which comprises drying and heating the peat, incorporating it with a hot melt essentially comprising mono-potassium phosphate and phosphoric acid in substantial amounts, agitating and digesting the peat therein, adding water, neutralizing the excess of acid with ammonia, and drying the resulting product in such a way as to avoid loss of ammonia.

9. The method of treating peat having an appreciable content of nitrogen to produce an effective fertilizer material therefrom, which method comprises incorporating the peat with a hot melt essentially comprising mono-potassium phosphate and phosphoric acid in substantial amounts, agitating the resulting mass and digesting the peat therein while maintaining the temperature above the solidifying point of the mixture, neutralizing the excess of acid with ammonia after cooling, and dehydrating the product in such a way as to avoid material loss of ammonia.

10. A process for preparing fertilizer material from peat, which comprises incorporating the peat with a hot melt essentially comprising mono-potassium phosphate and phosphoric acid, digesting the peat therein, and neutralizing the excess of acid.

11. A process for preparing fertilizer material from peat, which comprises incorporating the peat with a hot fluid mixture essentially comprising mono-potassium phosphate and phosphoric acid, forcing currents of air through the mixture while digesting the peat material therein and thus maintaining the temperature of the mass between about 170° C. to 180° C. for about one to one and one-half hours and then neutralizing the excess of acid with ammonia.

12. As a new composition of matter, an effective fertilizer containing substantial amounts of peat organic matter incorporated with potassium and ammonium salts of phosphoric acid and produced by the herein described method of making fertilizer, which consists in incorporating peat with and digesting it in a hot melt essentially comprising mono-potassium phosphate and free phosphoric acid; agitating the mass; adding water thereto; neutralizing the excess of acid with ammonia; and drying the product in such a way so as to avoid material loss of ammonia.

GEORGE P. WALTON.
ROBERT F. GARDINER.